United States Patent
Schoeller et al.

(10) Patent No.: US 11,411,662 B2
(45) Date of Patent: Aug. 9, 2022

(54) CALIBRATION SYSTEM

(71) Applicant: Rohde & Schwarz GmbH & Co. KG, Munich (DE)

(72) Inventors: Johannes Schoeller, Munich (DE); Marcus Bueche, Munich (DE); Michael Koenig, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/126,483

(22) Filed: Dec. 18, 2020

(65) Prior Publication Data

US 2022/0200708 A1 Jun. 23, 2022

(51) Int. Cl.
*H04B 17/21* (2015.01)
*H04B 17/14* (2015.01)
*H04B 1/00* (2006.01)
*H04B 1/26* (2006.01)

(52) U.S. Cl.
CPC ........... *H04B 17/14* (2015.01); *H04B 1/0003* (2013.01); *H04B 1/26* (2013.01); *H04B 17/21* (2015.01)

(58) Field of Classification Search
CPC ...................................................... H04L 12/28
See application file for complete search history.

(56) References Cited

U.S. PATENT DOCUMENTS

| | | | |
|---|---|---|---|
| 6,708,020 B1 * | 3/2004 | Hiramatsu | H04L 1/24 342/173 |
| 2006/0182197 A1 | 8/2006 | Godambe et al. | |
| 2008/0079439 A1 | 4/2008 | Murray et al. | |
| 2011/0190028 A1 | 8/2011 | Hahn et al. | |
| 2020/0044684 A1 | 2/2020 | Wang | |
| 2020/0044754 A1 | 2/2020 | Hueber et al. | |

* cited by examiner

*Primary Examiner* — Dang T Ton
(74) *Attorney, Agent, or Firm* — Christensen O'Connor Johnson Kindness PLLC

(57) ABSTRACT

A calibration system including a signal generator device, at least one calibration receiver and a processing circuit is described. The signal generator device has a signal generation circuit configured to generate a signal, at least one signal path terminating at a signal output port of the signal generator device, and at least one tap provided in the signal path. The at least one calibration receiver is connected with the at least one tap in the signal path. The at least one calibration receiver is connected with the processing circuit. The processing circuit is configured to receive measurement results obtained by the at least one calibration receiver and to analyze the measurement results received, thereby determining analysis results.

20 Claims, 2 Drawing Sheets

CALIBRATION SYSTEM

FIELD OF THE DISCLOSURE

Embodiments of the present disclosure relate to a calibration system.

BACKGROUND

In the state of the art, it is known to use a signal generator device that generates a signal with certain characteristics, wherein the signal generated is used for testing a device under test that receives the respective signal generated.

The signal generator device has several internal components that are used for generating the signal in the intended manner, namely with the respective characteristics. Accordingly, the signal generator device, particularly its internal components, has to be calibrated in order to ensure that the respective signals generated by the signal generator device have the intended characteristics. Moreover, the signal generator device, namely its internal components, have to be maintained in order to ensure that the signals generated have comparable characteristics, thereby ensuring reliable measurement results since no deviations are introduced by the signal generator device in an unintentional manner, particularly its internal components.

So far, the calibration of the signal generator device is done in a manual manner in certain time intervals, which however is time-consuming. Furthermore, the costs related thereto are high since a manual operator is required that performs the respective calibration routine. Furthermore, downtime of the signal generator device may occur provided that the signal generator device has not been calibrated with the maintenance interval. This may cause further problems since the measurement results obtained during that time may not be reliable anymore such that the respective tests have to be done again.

Accordingly, there is a need for a more cost-efficient way to calibrate a signal generator device.

SUMMARY

Embodiments of the present disclosure provide a calibration system used for calibrating a signal generator device. In an embodiment, the calibration system comprises a signal generator, at least one calibration receiver and a processing circuit or module. The signal generator or signal generator device has a signal generation circuit or module configured to generate a signal, at least one signal path terminating at a signal output port of the signal generator device, and at least one tap provided in the signal path. The at least one calibration receiver is connected with the at least one tap in the signal path. The at least one calibration receiver is connected with the processing module. The processing module is configured to receive measurement results obtained by the at least one calibration receiver and to analyze the measurement results received, thereby determining analysis results.

The main idea is to provide a signal generator device that has the tap which is provided additionally to the signal output port and which is different to the signal output port. The tap is used for connecting the at least one calibration receiver such that measurement results can be obtained at a certain location of the signal path of the signal generator device. Therefore, it is possible to calibrate the signal generator device probably, namely between the signal generation module and the tap or rather between the tap and the signal output port at which the signal path terminates. Generally, the signal path starts at the signal generation module and ends at the signal output port. The respective tap may be located at different positions within the signal path, which depends on the respective part of the signal path to be calibrated.

In general, the tap provides an additional functionality to the signal generator device that can be used for (internal) monitoring, (internal) diagnoses, (internal) self-tests and/or predictive maintenance of the signal generator device, for example its internal components.

Generally, parameters and/or information associated with the signal generator device, namely its respective components in the signal path, can be gathered via the tap that is connected with the at least one calibration receiver such that an active controlling of the signal generator device (servo loop), for example at least one of its components, may be done. In other words, a feedback loop is provided via the at least one tap located in the signal path, the calibration receiver and the processing module that interacts with the signal generation module, for example that controls the signal generation module.

An aspect provides that the processing module is connected with the signal generation module. Accordingly, the processing module receives information from the signal generation module as well, namely information concerning the signal to be generated. This information received from signal generation module is gathered in addition to the measurement results that were received from the at least one calibration receiver that is connected with the tap in the signal path. Therefore, the processing module may gather information concerning the signal to be generated by the signal generator device, namely by receiving the respective data and/or information from the signal generation module, as well as data and/or information concerning the signal generated and processed up to the position of the tap in the signal path. Hence, the processing module is enabled to determine how the signal generated has already been deviated or rather varied due to the signal processing by the signal generated device along the signal path, for example up to the position of the tap in the signal path.

Another aspect provides that the processing module is configured to determine the analysis results based on the measurement results obtained by the at least one calibration receiver and data gathered from the signal generation module. As mentioned above, the respective data and/or measurement results can be compared appropriately in order to determine the respective analysis results that indicate performance characteristics of the signal generator device.

The at least one tap may be located between an IQ modulator and an amplifier, between a first amplifier and a second amplifier, between an amplifier and an attenuator and/or between a digital analog converter and an IQ modulator. Therefore, information concerning the different internal components of the signal generator device may be gathered depending on the respective location of the tap within the signal path. Depending on the location of the tap, different information may be gathered that can be used for determining the respective analysis results.

In some embodiments, several taps are provided in the signal path. The several taps may relate to at least two taps that are located at different positions within the signal path such that a part of the signal path may be investigated that does not start at the signal generation module and that does not end at the signal output port. The several taps my however also relate to more than two taps such that the signal path can be divided into several different parts in order to gather as much information as possible. In some embodiments, information concerning each of the internal components of the signal generator device may be gathered depending on the respective number of taps provided.

Generally, depending on the respective location of the tap, information may be gathered concerning suppression of harmonics, equalization of non-linearities introduced by internal components in the signal path and/or equalization of the spectrum provided by the signal.

The calibration system may comprise a multiplexer that is connected with the several taps and the at least one calibration receiver. Hence, a signal calibration receiver may be sufficient since the signal calibration receiver receives only one signal tapped at a certain moment in time, which depends on the respective switching position of the multiplexer.

Alternatively, at least two calibration receivers are provided that are each connected with a dedicated tap of the several taps. In some embodiments, an unambiguous association of the calibration receivers with respect to the taps is ensured. Hence, information and/or measurement results may be obtained for different taps simultaneously due to the fact that two or even more different calibration receivers are operated simultaneously. The several calibration receivers may also forward their respective measurement results, for example together with a time stamp, to the processing module that may correlate the respective measurement results.

For instance, the processing module is configured to determine the analysis results based on the measurement results obtained by the at least two calibration receivers. Hence, information concerning a part of the signal path that does not start at the signal generation module and that does not end at the signal output port can be gathered. In some embodiments, a first of the at least two calibration receivers is associated with a tap that is located at the beginning of the respective part of the signal path, whereas the other of the at least two calibration receivers is connected with a tap that is associated with the end of the respective part of the signal path. Taking the measurement results of both calibration receivers into account, information concerning the behavior of the respective part of the signal path can be gathered.

Moreover, the signal generator device or the processing module may be configured to activate at least one of the several taps. Thus, the signal generator device is enabled to initiate a test procedure according to which the taps are activated in a subsequent manner such that the processing module receives the measurement results of the corresponding calibration receivers.

For instance, the signal generator device or the processing module is configured to activate the several taps individually and/or subsequently, thereby ensuring that the signal path of the signal generator device is divided into several parts that can be analyzed and/or calibrated one after the other in order to identify components associated with the respective parts that have to be calibrated.

In some embodiments, the signal generator device or the processing module is configured to activate at least two of the several taps simultaneously. Therefore, the respective part of the signal path which is of interest can be investigated accordingly.

Further, the processing module may be configured to determine the analysis results indicating a signal processing quality of at least one of a part of the signal path. As described above, the processing module receives the respective measurement results from the calibration receivers, thereby processing the measurement results in order to obtain the analysis results that may indicate the quality of the respective part of the signal path that is used for processing the signal generated.

According to a further aspect, the part of the signal path is defined between two taps in the signal path or between the tap and the signal generation module or between the tap and the signal output port. Accordingly, the entire signal path may be separated into several different parts, wherein each of the different parts is associated with the at least one tap that is connected to the at least one calibration receiver.

According to another aspect, the processing module is configured to forward the analysis results to at least one external data processing circuit or module. The external data processing module may combine information received from several different modules and/or devices in order to obtain an overview of the respective information associated with the at least one signal generator device.

Further, the respective analysis results may be used for enriching a data base that can be accessed by different operators and/or users, for example users or rather operators that have a similar signal generator device, namely a signal generator device of the same type. Hence, comparable information may be gathered and shared in order to obtain an overview. Moreover, it is possible to get the information if the own signal generator device has an untypical behavior by comparing measurement results and/or analysis results of several signal generator devices, for example of the same type.

The external data processing module may be at least one of a network device, a server or a computer. The network device or rather the server may be connected via an Ethernet connection or rather a local area network connection with the processing module. The computer may be directly connected with the processing module. Moreover, the computer may comprise the processing module.

The at least one calibration receiver may be separately formed with respect to the signal generator device. Thus, the at least one calibration receiver is a separate device that has its own housing. The signal generator device may have its own housing wherein the housing of the signal generator device encompasses the signal source, the signal path, the IQ modulator, at least one amplifier as well as at least one attenuator. The signal output port may be located at an outer side of the housing of the signal generator device.

Another aspect provides that the processing module is integrated within the signal generator device. Hence, the calibration system may comprise two different separately formed devices, namely the signal generator device as well as the at least one calibration receiver.

According to another embodiment, a device under test may be connected with the signal output port of the signal generator device via a connection line. The connection line may comprise at least one of a cable connection and a test fixture. Accordingly, any influences of a device under test connected with the signal generator device may also be taken into account when calibrating the signal generator device.

For instance, a further tap may be provided in the connection line. Thus, information may also be gathered that is associated with the device under test. For instance, the spectrum of the signal received by the device under test can be equalized by taking measurement results of the calibration receiver into account that is connected with the further tap.

Another aspect provides that the signal generation module is configured to generate the signal and a test signal in a superimposed manner. The at least one calibration receiver is configured to measure characteristics of the test signal propagating from the signal generation module to the at least one tap with which the at least one calibration receiver is connected. Thus, the signal generator device generates an output signal that is provided at the signal output port, wherein the test signal is hidden in the output signal, namely in a superimposed manner. The test signal is generated such that it does not disturb the output signal. However, the test signal may be evaluated appropriately by correlation during operation of the signal generator device such that thermal drifts, slow changes of voltage standing wave ratio (VSWR) and further characteristics can be compensated that may occur at the signal output port or rather within the device under test.

The at least one calibration receiver may comprise a comb generator. The calibration receiver with a comb generator may be used for phase adjustment or rather phase correction, for example of several devices, by sampling and separating interleaved combs received, for example of the several devices. Accordingly, phase and/or group delay of the signal generator devices can be determined in absolute terms as well as relative to each other, for example by the processing module.

Alternatively, the at least one calibration receiver is established by a superheterodyne receiver ("superhet"). The superheterodyne receiver is a type of radio receiver that uses frequency mixing to convert a received signal to a fixed intermediate frequency (IF) which can be more conveniently processed than the original carrier frequency.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
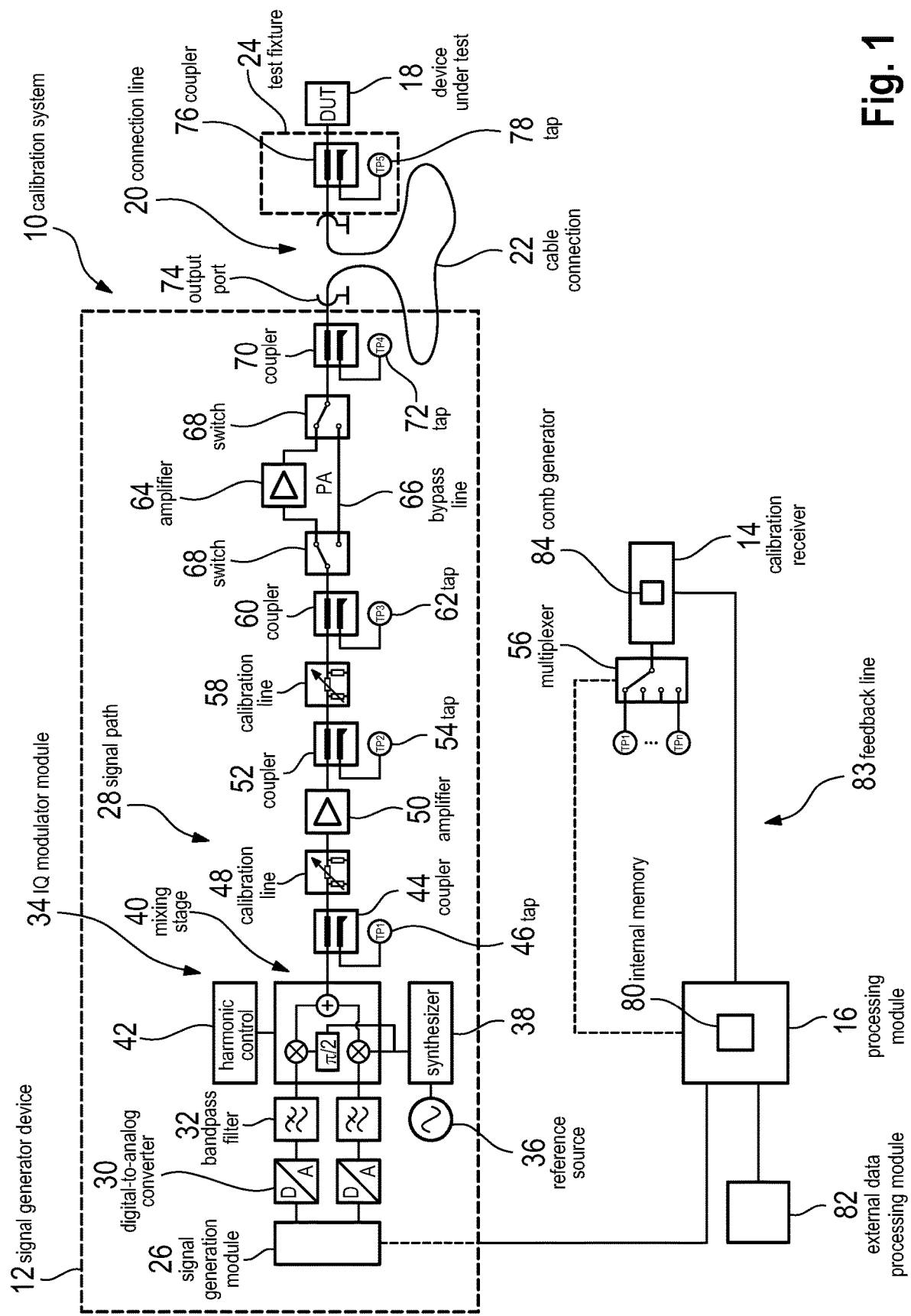
FIG. 1 schematically shows a calibration system according to a first embodiment of the present disclosure, and FIG. 2 schematically shows a calibration system according to a second embodiment of the present disclosure.

In FIG. 1, a calibration system 10 is shown that comprises a signal generator, referred to as a signal generator device 12, at least one calibration receiver 14 as well as a processing circuit or module 16. In the shown embodiment, the signal generator device 12, the at least one calibration receiver 14 as well as the processing module 16 are separately formed such that each of these devices has its own housing.

In some embodiments, the term "module" refers to a combination of hardware (e.g. a processor such as an integrated circuit or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

In the embodiment shown in FIG. 1, the calibration system 10 also comprises a device under test 18 that is connected with the signal generator device 12 by a connection line 20 that comprises, for example, a cable connection 22 as well as a test fixture 24.

Generally, the signal generator device 12 is configured to generate a certain signal that is forwarded to the device under test 18 for testing purposes. The signal generator device 12 comprises a signal generation circuit or module 26 that generates a signal that is processed by internal components of the signal generator device 12 along a signal path 28. In the signal path 28, digital-to-analog converters 30 as well as bandpass filters 32 are provided, for example low-pass filters.

Further, the signal generator device 12 in some embodiments has an IQ modulator circuit or module 34 that comprises a reference source 36, a synthesizer 38, a mixing stage 40 as well as a harmonic control 42 for suppressing harmonics in the signal generated. In addition, the signal generator device 12 has a coupler 44 that is connected downstream of the IQ modulator module 34 wherein the coupler 44 provides a tap 46.

The tap 46 is connected with the separately formed calibration receiver 14 such that the calibration receiver 14 is enabled to obtain measurement results at the location of the tap 46 in the signal path 28 of the signal generator device 12. Accordingly, information concerning the variation and/or deviation of the signal processed until the tap 46 can be identified appropriately. The coupler 44 is located upstream of a calibration line 48, for example with an attenuator, within the signal path 28 that is also connected with an amplifier 50.

The signal generator device 12 further comprises a second coupler 52 located downstream of the amplifier 50 in the signal path 28, wherein a second tap 54 is associated with the second coupler 52. The second tap 54 is also connected with the signal calibration receiver 14.

Accordingly, a multiplexer 56 is provided that ensures that the several taps 46, 54 can be forwarded to the same signal calibration receiver 14, for example in a subsequent manner.

The signal generator device 12 further comprises another calibration line 58, for example with attenuator, as well as a third coupler 60 in the signal path 28 that again is associated with a third tap 62, which is connected with the signal calibration receiver 14 via the multiplexer 56 as well.

Furthermore, the signal generator device 12 has another amplifier 64 that can be bypassed by a bypass line 66. For this purpose, two switches 68 are provided that are located downstream and upstream of the bypass line 66 and the second amplifier 64. Hence, the second amplifier 64 is connected with the bypass line 66 in parallel such that the second amplifier 64 can be bypassed appropriately.

A fourth coupler 70 is provided downstream of the switches 68, wherein the fourth coupler 70 is associated with the fourth tap 72 that is also connected with the signal calibration receiver 14 via the multiplexer 56.

At the end of the signal path 28 a signal output port 74 is provided that is connected with the device under test 18 via the connection line 20.

In the embodiment shown in FIG. 1, the test fixture 24 also comprises a coupler 76 that is associated with a further tap 78 which is connected with the calibration receiver 14 via the multiplexer 56 as well.

Accordingly, the single calibration receiver 14 is enabled to obtain measurement results at different locations within the signal path 28 due to the different positions of the taps 46, 54, 62, 72 within the signal path 28. In addition, the single calibration receiver 14 is also enabled to measure the signal at the location of the device under test 18 via the further tap 78 associated with the test fixture 24.

The single calibration receiver 14 gathers the different measurement results at the different locations of the taps 46, 54, 62, 72, 78 in a subsequent manner wherein the multiplexer 56 is controlled accordingly, for instance by the processing module 16 or the signal generator device 12, thereby forwarding the respective signals tapped at the different locations to the signal calibration receiver 14 for obtaining measurement results.

The calibration receiver 14 forwards the measurement results obtained to the processing module 16, for instance together with a certain time stamp. The processing module 16 is configured to receive the measurement results and to analyze the measurement results received in order to determine analysis results.

Thus, the processing module 16 may comprise an internal memory 80 that is used to at least temporarily store measurement results forwarded from the calibration receiver 14 in order to compare different measurement results obtained from different locations in the signal path 28 or rather from the device under test 18. By comparing the different measurement results, the processing module 16 is enabled to indicate any signal processing quality of parts of the signal path 28, for example between two taps 46, 54, 62, 72, 78. The respective taps 46, 54, 62, 72, 78 may have been actively selected previously.

In addition, the processing module 16 may also be connected with the signal generation module 26 such that the processing module 16 is able to receive information concerning the signal to be generated.

By comparing the data obtained from the signal generation module 26 and measurement results obtained at any position within the signal path 28, the processing module 16 is able to provide information concerning the signal processing characteristics of the signal generator device 12.

Moreover, the calibration system 10 comprises an external data processing circuit or module 82 that communicates with the processing module 16. For example, the data processing module 16 forwards the analysis results to the external data processing module 82 for further processing. The external data processing module 82 may be established by a network device, a server and/or a computer.

Generally, a feedback line 83 or an active control line is provided by the calibration receiver 14 and the processing module 16 since the processing module 16 may control the signal generation module 26 depending on the analysis results determined. This can be used for maintenance and/or calibration purposes.

As shown, the at least one tap 46, 54, 62, 72, 78 may be located between an IQ modulator circuit or module 34 and an amplifier 50, between a first amplifier 50 and a second amplifier 64, between an amplifier 50 and an attenuator 58 and/or between a digital analog converter 30 and an IQ modulator module 34.

For instance, the adjustment for optimal suppression of harmonics could be performed at tap 46, in addition to the previous local oscillator and sideband adjustment. At tap 54, the nonlinearity of IQ modulator module 34 and amplifier 50 could be equalized together. At tap 62, a relative adjustment and linearity of the calibration line 48 may take place.

Tap 72 is located directly at the signal output port 74. Hence, tap 72 can be used to linearly equalize the spectrum up to the signal output port 74 and to realize an active VSWR over the complete modulation bandwidth during operation of the signal generator device 12. A significantly increased level accuracy may be provided not only at center frequency, which is typically realized via sample hold, but over the entire modulation bandwidth.

At tap 78, the spectrum as equalized as possible at the device under test 18, not only at the signal output port 74, may be investigated.

The taps 46, 54, 62, 72 may be used for internal monitoring, diagnoses and predictive maintenance of the signal generator device 12 since information concerning the signal path 28 may be gathered at different locations.

For instance, the mechanical calibration lines 48, 58 can be monitored. Analysis of the level error in the event of level jumps gives an indication of wear of the calibration lines 48, 58.

Furthermore, aging effects of the amplifiers 50, 64 may be monitored and investigated. Possible signs of impending failure are reduced level, increased non-linearity, etc.

Generally, all taps 46, 54, 62, 72, 78 can be used to actively readjust parameters in the signal generator device 12 (e.g. as ALC, etc.).

Figure 2:
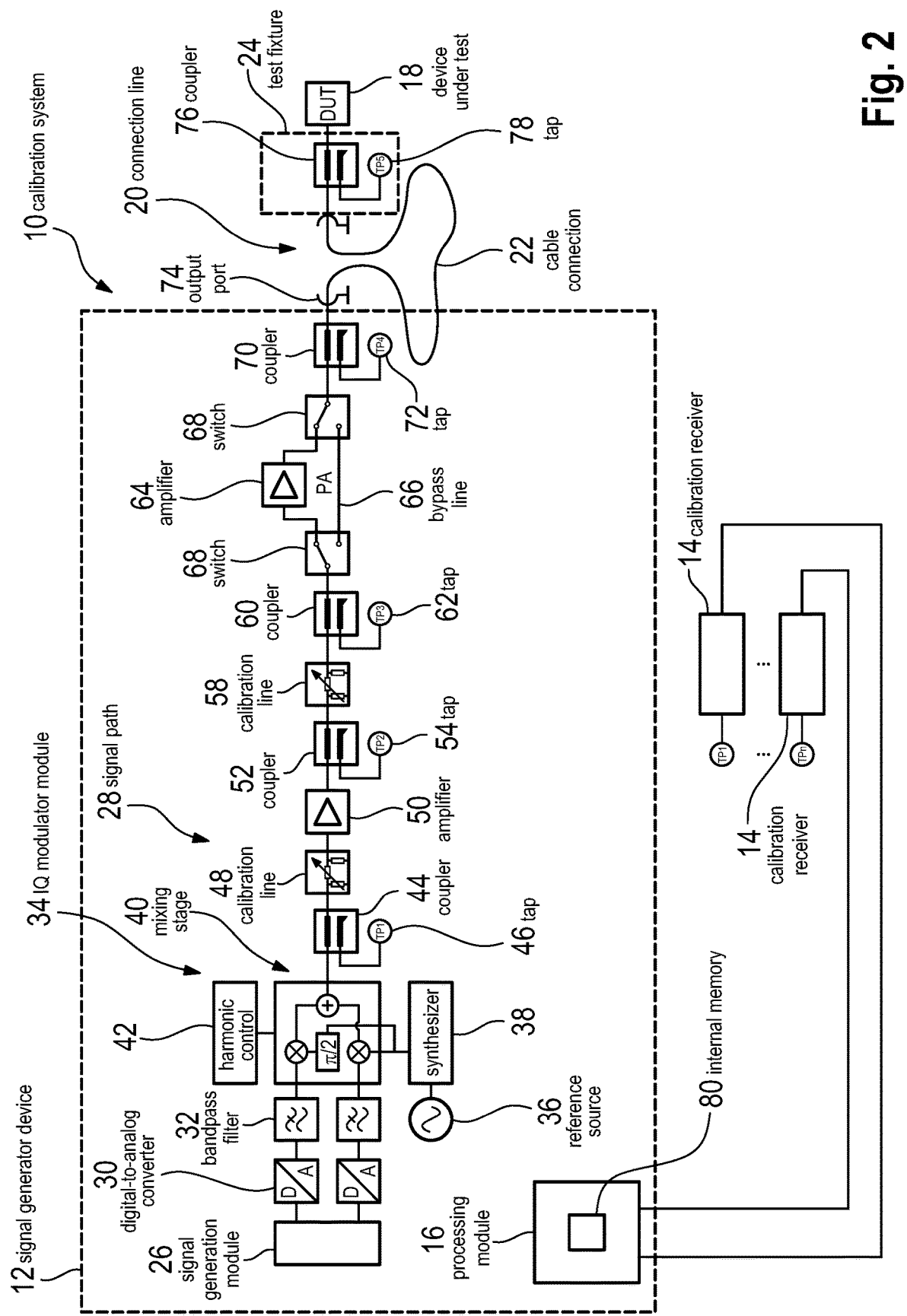

In FIG. 2, an alternative embodiment is shown that differs from the one shown in FIG. 1 in that the signal generator device 12 comprises the processing module 16 that is an internal component of the signal generator device 12. In addition, several calibration receivers 14 are provided that are each connected with the dedicated tap of the several taps 46, 54, 62, 72, 78 provided.

Accordingly, the number of calibration receivers 14 may correspond to the number of taps 46, 54, 62, 72, 78, thereby ensuring that measurement results at different locations within the signal path 28 as well as at the device under test 18 can be gathered simultaneously.

Again, the calibration receivers 14 are connected with the processing module 16 that is able to process the measurement results received from the several calibration receivers 14 in order to gather analysis results as described above. Generally, the processing module 16 or rather the signal generator device 12 may be used to activate at least one of the several taps 46, 54, 62, 72, 78 in order to test a certain part of the signal path 28.

In some embodiments, at least two of the several taps 46, 54, 62, 72, 78 are activated simultaneously, thereby ensuring that the respective part of the signal path 28 is not terminated by the signal generator module 26 or rather the signal output port 74.

For testing purposes, the signal generation module 26 generates the signal used for testing the device under test 16 and a test signal used for internal testing of the signal generator device 12 in a superimposed manner.

During regular operation of the signal generator device 12, the test signal can be "hidden" in the signal forwarded to the device under test 16. The test signal does not interfere with the signal. By correlation, the test signal can be evaluated by the calibration receiver 14 in order to detect thermal drifts, slow changes at the VSWR, etc. at the signal output port 74 or at the DUT 18 during operation.

The at least one calibration receiver 14 measures characteristics of the test signal propagating from the signal generation module 26 to the at least one tap 46, 54, 62, 72, 78 with which the at least one calibration receiver 14 is connected. Hence, information concerning the internal components involved in signal processing up to the respective tap can be gathered accordingly.

Generally, the at least one calibration receiver 14 may comprise a comb generator 84 composed of one or more circuits. The calibration receiver 14 with the comb generator 84 can be used for phase adjustment or rather phase correction, for example of several signal generator devices, by sampling and separating interleaved combs received, for example of the several signal generator devices.

Accordingly, phase and/or group delay of the signal generator devices can be determined in absolute terms as well as relative to each other, for example by the processing module 16.

Alternatively, the at least one calibration receiver 14 is established by a superheterodyne receiver ("superhet"). The superheterodyne receiver is a type of radio receiver that uses frequency mixing to convert a received signal to a fixed intermediate frequency (IF) which can be more conveniently processed than the original carrier frequency.

Certain embodiments disclosed herein, for example the respective module(s), unit(s), etc., utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A calibration system, comprising:
   a signal generator having a signal generation circuit configured to generate a signal, at least one signal path terminating at a signal output port of the signal generator, and at least one tap provided in the signal path
   at least one calibration receiver connected with the at least one tap in the signal path; and
   a processing circuit connected to the at least one calibration receiver, the processing circuit configured to receive measurement results obtained by the at least one calibration receiver and to analyze the measurement results received, thereby determining analysis results.

2. The calibration system according to claim 1, wherein the processing circuit is connected with the signal generation circuit.

3. The calibration system according to claim 2, wherein the processing circuit is configured to determine the analysis results based on the measurement results obtained by the at least one calibration receiver and data gathered from the signal generation circuit.

4. The calibration system according to claim 1, wherein the at least one tap is located between an IQ modulator and an amplifier, between a first amplifier and a second amplifier, between an amplifier and an attenuator and/or between a digital analog converter and an IQ modulator.

5. The calibration system according to claim 1, wherein several taps are provided in the signal path.

6. The calibration system according to claim 5, wherein the calibration system comprises a multiplexer that is connected with the several taps and the at least one calibration receiver.

7. The calibration system according to claim 5, wherein at least two calibration receivers are provided that are each connected with a dedicated tap of the several taps.

8. The calibration system according to claim 7, wherein the processing circuit is configured to determine the analysis results based on the measurement results obtained by the at least two calibration receivers.

9. The calibration system according to claim 5, wherein the signal generator device or the processing circuit is configured to activate at least one of the several taps.

10. The calibration system according to claim 5, wherein the signal generator device or the processing circuit is configured to activate at least two of the several taps simultaneously.

11. The calibration system according to claim 1, wherein the processing circuit is configured to determine the analysis results indicating a signal processing quality of at least one of a part of the signal path.

12. The calibration system according to claim 11, wherein the part of the signal path is defined between two taps in the signal path or between the tap and the signal generation circuit or between the tap and the signal output port.

13. The calibration system according to claim 1, wherein the processing circuit is configured to forward the analysis results to at least one external data processing circuit.

14. The calibration system according to claim 13, wherein the external data processing circuit is at least one of a network device, a server or a computer.

15. The calibration system according to claim 1, wherein the at least one calibration receiver is separately formed with respect to the signal generator device.

16. The calibration system according to claim 1, wherein the processing circuit is integrated within the signal generator device.

17. The calibration system according to claim 1, wherein a device under test is connected with the signal output port of the signal generator device via a connection line.

18. The calibration system according to claim 17, wherein a further tap is provided in the connection line.

19. The calibration system according to claim 1, wherein the signal generation circuit is configured to generate the signal and a test signal in a superimposed manner, the at least one calibration receiver being configured to measure characteristics of the test signal propagating from the signal generation circuit to the at least one tap with which the at least one calibration receiver is connected.

20. The calibration system according to claim 1, wherein the at least one calibration receiver comprises a comb generator or wherein the at least one calibration receiver is established by a superheterodyne receiver.

* * * * *